United States Patent [19]

Stroobants

[11] 3,977,358

[45] Aug. 31, 1976

[54] CAN FEEDING AND COATING APPARATUS

[76] Inventor: Alphonse Stroobants, Rte. 1, Forest, Va. 24502

[22] Filed: May 8, 1975

[21] Appl. No.: 575,988

[52] U.S. Cl. .................... 118/2; 118/50; 118/319; 118/318; 198/22 R; 198/25

[51] Int. Cl.[2] .................... B05C 7/02; B05C 11/10; B65G 47/84

[58] Field of Search .................... 118/319, 50, 320, 230, 118/2, 318, 8, 232; 198/22 R, 22 B, 25, 241, 242, 210

[56] References Cited

UNITED STATES PATENTS

| | | | |
|---|---|---|---|
| 1,256,070 | 2/1918 | Stake | 198/22 B |
| 2,103,270 | 12/1937 | Murch | 118/319 |
| 2,202,640 | 5/1940 | Thomas | 198/22 |
| 2,324,890 | 7/1943 | Temple | 118/319 X |
| 2,426,391 | 8/1947 | Emerson | 118/319 X |
| 2,919,801 | 1/1960 | Pechy | 198/22 R X |
| 3,452,709 | 7/1969 | Hartmeister et al. | 118/318 X |
| 3,726,711 | 4/1973 | Hogstrom | 118/318 X |

*Primary Examiner*—John P. McIntosh
*Attorney, Agent, or Firm*—Mason, Fenwick & Lawrence

[57] ABSTRACT

An automatic can coating and feed means includes indexed turret means having a plurality of can supporting means spaced about its periphery including a driven vacuum chuck and can engaging roller supporting cans engaged on their sides by a driven roller for rotation about the can axis; can infeed means adjacent the turret feeds a can into said can supporting means during dwell of the turret, automatically operable spray means adjacent the turret coats the can interior during the dwell of the turret; in a second embodiment the cans engage driven belts upstream of the spray station so that they are already rotating upon arrival at the spraying station with a unique star wheel feed effecting rapid feeding of cans to the turret to provide rapid operation of the entire device.

12 Claims, 13 Drawing Figures

CAN FEEDING AND COATING APPARATUS

This invention is directed to unique can feeding and coating means and is specifically directed to means for automatically providing a liquid coating such as lacquer or the like on the interior of containers or cans.

A number of prior known devices have evolved for the purpose of automatically applying a liquid coating to the interior of cylindrical cans or other containers such as the device disclosed in U.S. Pat. No. 3,452,709 to Hartmeister et al. However, the prior known devices for this purpose have suffered from a number of drawbacks with the primary deficiency being the slowness of operation of such devices.

It is conventional in the prior art devices to feed the cans to a rotary turret or the like which then conveys the cans to a spraying position in which the can is rotated while the interior is sprayed with the coating liquid. The prior known devices have employed means engageable with the can after it arrives at the spraying station for initiating rotation of the can. Since the spraying means cannot be effectively operated until the can has reached rotational speed, time delays are inherent in the prior known devices due to the slippage of the frictional engagement of the rotating means with the side of the can and the inertial delays required for bringing the can up to rotational speed.

Another time consuming aspect of the operation of the prior known can coating devices as well as other can handling or treating devices is the inherent slowness of the can feeding means for providing the cans to the coating equipment. While some of the prior known feed means are fully capable of keeping up with the presently known spraying means, any increase in the rapidity with which the spraying function is completed has been prevented by the speed limitations of the can feeding means and many fabrication or treatment devices cannot be operated at maximum speed due to the slowness of the recently known can infeed means used with such devices.

Therefore, it is the primary object of this invention to provide a new and improved can coating means for providing a coating of liquid on the interior of cans.

Yet another object of the invention is the provision of a new and improved can coating means in which the time required for the can presence in the spraying station is reduced so as to speed up the overall machining operation.

A still further object of the invention is the provision of a new and improved can infeed means of high speed capability for feeding can members to a work conveying turret.

Achievement of the foregoing objects is enabled in the first embodiment of the invention by the provision of rotary work turret mounted for rotation on a horizontal axis and driven by an indexing means through 60° increments of rotation with the turret remaining in a dwell position following each indexing of the turret. The cans are received in supporting rollers spaced about the turret and defining rotary can support stations which are selectively indexed to a spraying position. As the can arrives at the spraying position, it is engaged by friction drive rollers engaging the sides of the can and is simultaneously attracted to a vacuum chuck which is continuously driven so that the frictional engagement of the cans with the vacuum chuck provides an additional force supplied to the cans for bringing the cans up to desired rotational speed in an expeditious manner.

As the can reaches the desired rotational speed, sprayer means directs a spray of liquid into the can interior which continues to be rotated for several more revolutions following actuation of the sprayer means. The sprayer is then deactivated and the can is indexed to outfeed means from which it is discharged from the apparatus.

The can rotation means of the first embodiment comprises a shaft on which a plurality of rollers having friction members about their outer periphery are mounted for driven rotation. The rollers engage the side of the can as well as the side of the vacuum chuck to rotate both the can and chuck at a uniform speed. The can rotating means of the second embodiment differs from that of the first embodiment in that means are provided for rotating the cans prior to their arrival and during and after their arrival at the spraying station. Additionally, the second embodiment employs a power feed means for positively feeding can members to the turret in a rapid manner so as to achieve a faster operation than is possible with the first embodiment. This faster operation is achieved by virtue of the fact that the can members do not have to be brought up to rotational speed before the sprayer is actuated and the fact that the power driven positive can feed means operates at a much higher speed than is possible with the gravity can feed system employed in the first embodiment.

More specifically, the can drive means of the second embodiment comprises a constantly driven shaft on which a plurality of sheaves are fixed. A pair of can drive upper friction belts are mounted on two of the sheaves to extend upwardly toward the next upstream dwell position of the turret from the spraying position with the upper ends of the belts being supported on idler sheaves on a support shaft adjacent the periphery of the turret. Consequently, indexing movement of cans toward the spraying position initially brings the cans into contact with the two flights of the upper belts facing the turret so that the cans immediately begin to rotate. Additionally, lower idler rollers are provided below the constant speed driven shaft and a pair of can drive downwardly extending friction belts extend from other sheaves on the driven shaft to lower idler sheaves on a shaft adjacent the turret so as to have inner flights engageable with the cans in the spraying position for constantly rotating the cans during the spraying operation. Moveover, the can continues to be rotated by the lower belts following the deactivation with the of means so as to provide a uniform application and drying of liquid on the interior of the can as the can is being indexed away from discharge from the device. A third or chuck driving friction belt extends downwardly from a third sheave on the driven shaft and has a flight engaging the periphery of the vacuum chuck for driving the vacuum chuck in the same direction and at the same speed as cans carried by the chuck. The lower end of the chuck driving friction belt is mounted on an idler sheave on the same support shaft as the idler sheaves of the two can engaging downwardly extending friction belts engaging the sides of the can during the spraying position.

An additional feature of the second embodiment resides in the provision of a star wheel mounted on a driven shaft rotating at a constant speed for removing the lowermost can from a stack of cans fed to the star wheel by stationary guide means and carrying the can around to the turret for forcefully positioning the can on work supporting means on the periphery of the turret during a dwell portion of the turret operation. Stripper plates extend alongside opposite sides of the star wheel for engaging the can during the feeding operation so as to move the can outwardly radially with respect to the star wheel so that the outer edge of the star wheel eventually serves to push the can into the turret with the following surface portion of the star wheel being of constant radius for maintaining the can in the can supporting position during subsequent indexing of the turret.

A better understanding of the manner in which the invention achieves the foregoing objects will be enabled when the following written description of the preferred embodiments is considered in conjunction with the appended drawings in which.

Figure 1:
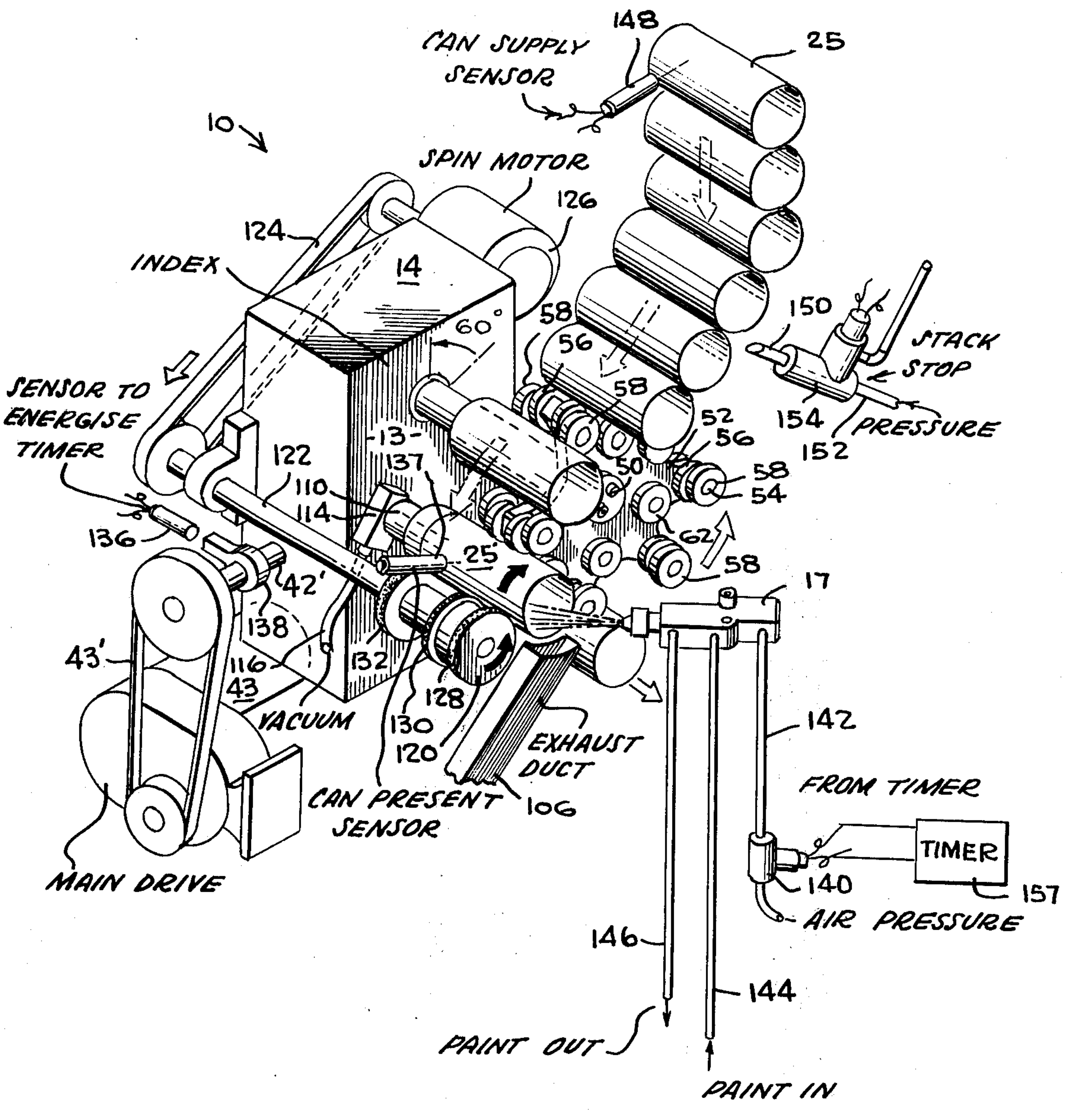
FIG. 1 is a perspective view of a first embodiment of the invention.
Figure 2:
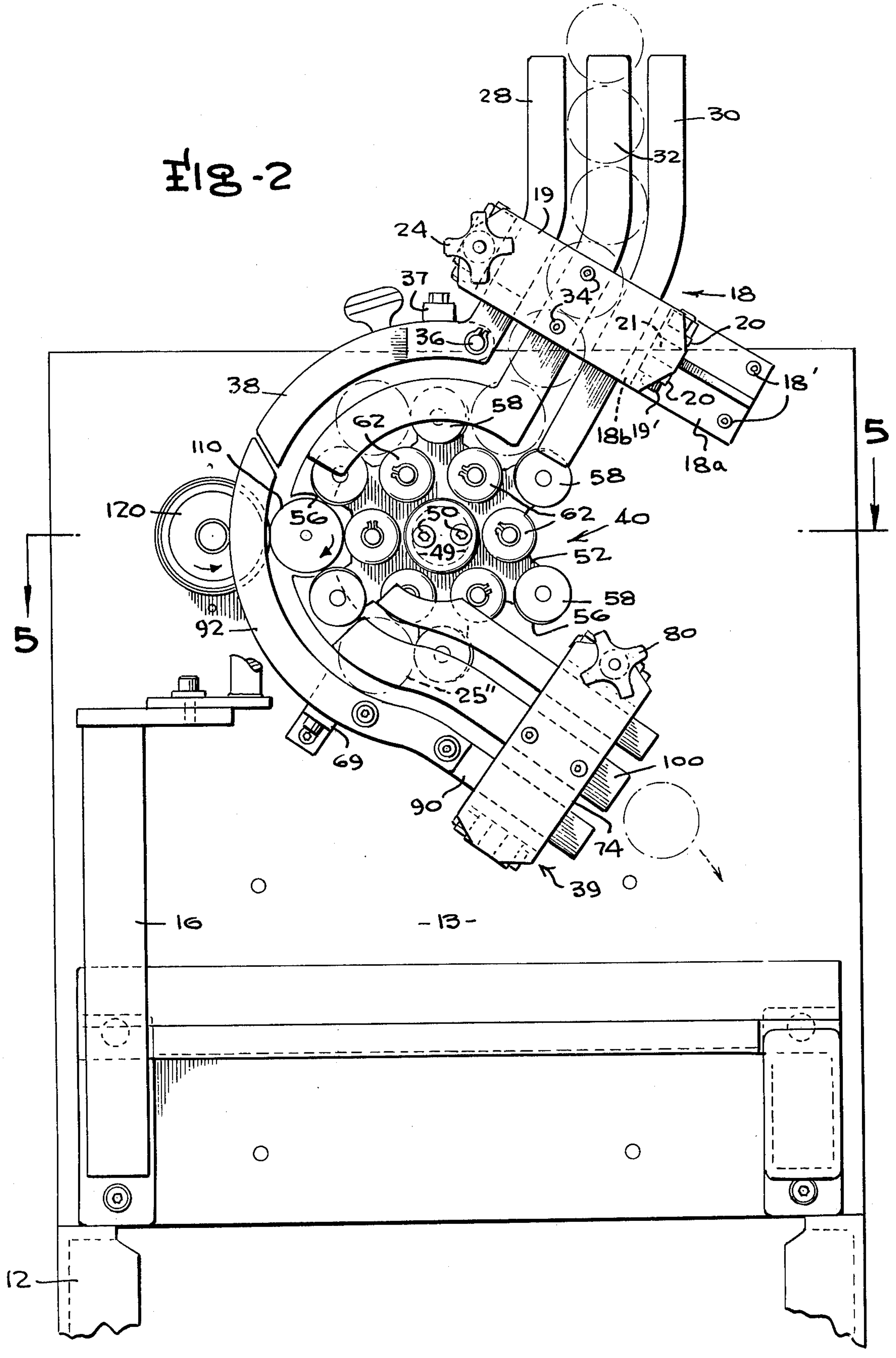
FIG. 2 is a front elevation view of the embodiment of FIG. 1.
Figure 3:
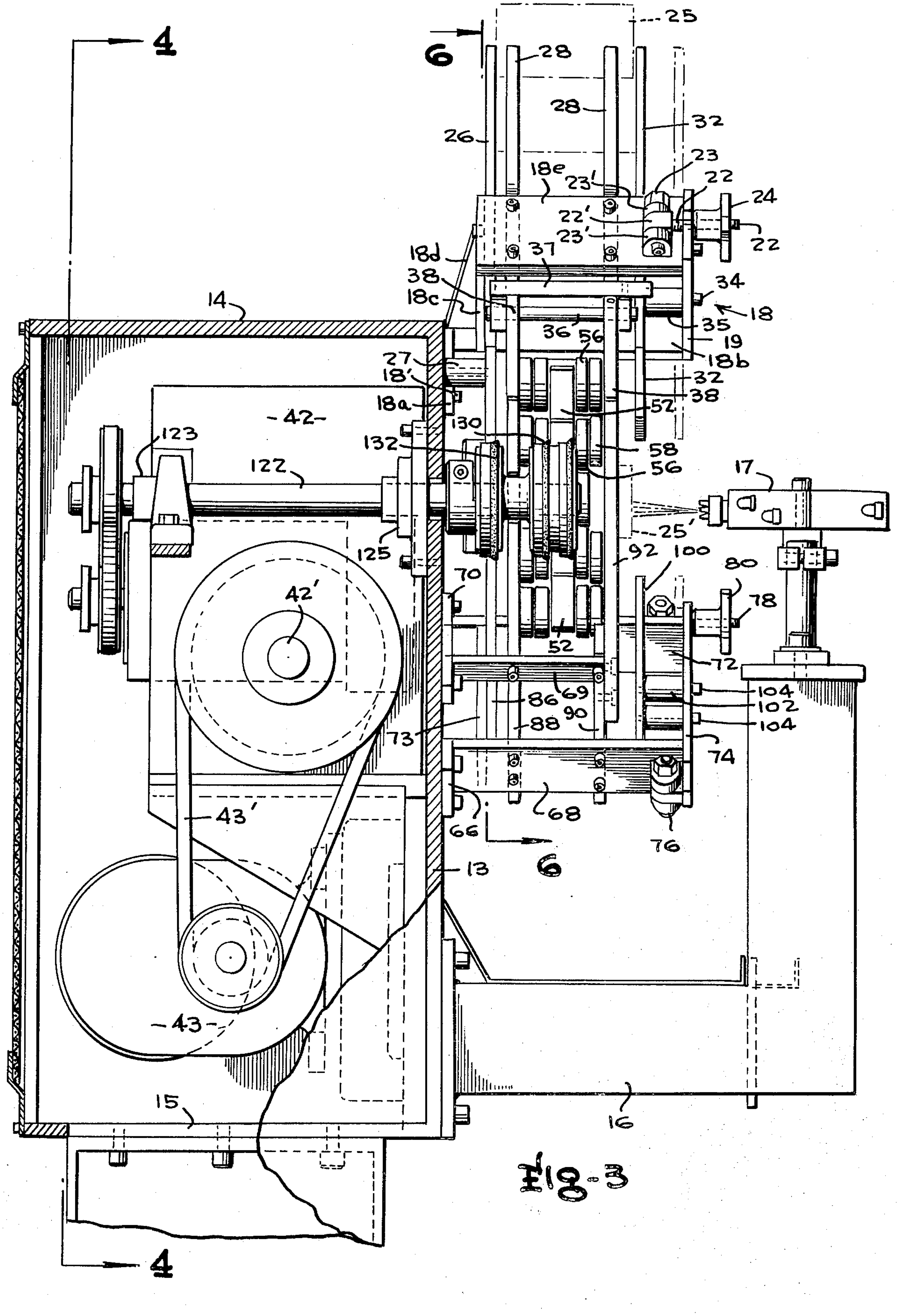
FIG. 3 is a side elevation of the embodiment of FIG. 1 with parts removed for purposes of clarity.
Figure 4:
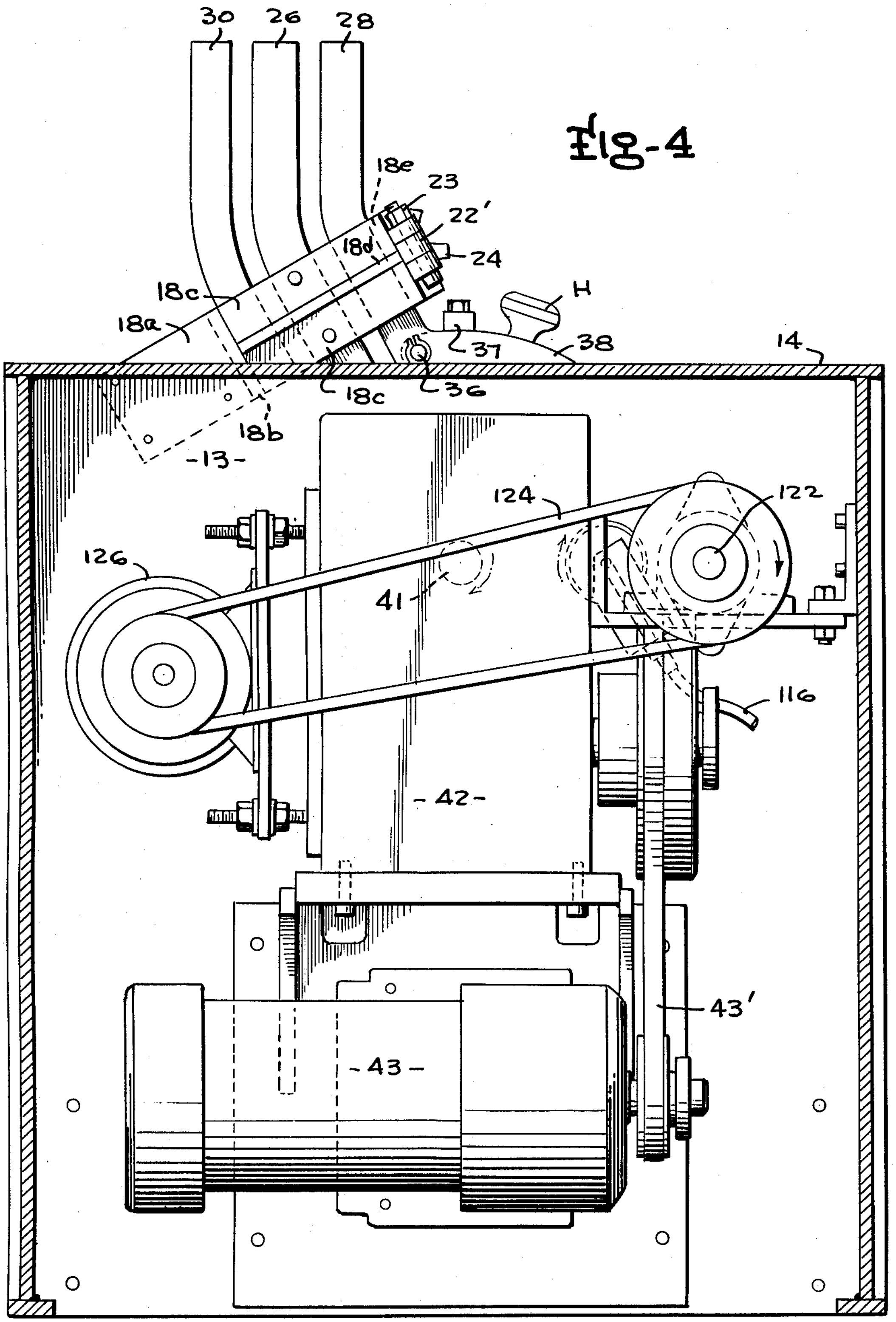
FIG. 4 is a sectional view taken along lines 4—4 of FIG. 3.

Attention is initially invited to FIGS. 1–3 which illustrate a first embodiment 10 of the invention which is directed to apparatus for receiving open-topped uncoated cans and applying a uniform coating on the interior of the cans.

Support for the various components of the apparatus is provided by a pedestal 12 (FIG. 3) to which a housing including a main support plate 13, a top plate 14 and a bottom plate 15 is mounted. An L-shaped cantilever arm means 16 extends outwardly from the main support plate 13 and provides adjustable support for a conventional selectively operable spray gun 17.

An upper can guide support bracket generally designated 18 is attached to the front face of the main support plate 13 by means 18' (FIG. 2). The upper can guide support bracket 18 includes a base plate **18*a* (FIG. 3) from which a lower horizontally extended cantilever plate 18*b* extends outwardly perpendicularly with respect to the base plate and the main support plate 13. A fixed inside plate 18*c* extends perpendicularly from the upper surface of the cantilever plate 18*b* and is braced by a gusset plate 18*d* with a top plate 18*e* being fixedly connected to the upper end of the fixed inside plate 18*c* and the gusset plate 18*d* to extend outwardly parallel to the lower cantilever plate 18*b*. The base plate 18*a*, cantilever plate 18*b*, fixed inside plate 18*c*, gusset 18*d* and the upper cantilever plate 18*e* form a unitary generally U-shaped construction to which a hinge plate 19 is hingedly connected by means of a pivot bolt 19' extending through a pair of pivot lugs 20 on the lower cantilever plate 18*b* and an interleaved hinge lug 21 fixedly connected to the hinge plate 19**.

Guide means for cans 25 being fed to the apparatus are supported by the upper can guide support brackets 18. The cans 25 are closed at one end and are open on their opposite end which faces the viewer in FIG. 1 and FIG. 2. The can guide means includes a fixed rear guide 26 mounted against the inside surface of the fixed inside plate **18*c* and also mounted at its lower end by a spacer sleeve 27 and machine screw 27' so as to be engageable with the closed ends of the cans 25**.

First and second fixed top guide members 28 are connected to and fixedly supported by the upper cantilever plate **18*e* and a pair of fixed lower guide members 30 are fixedly connected to the lower cantilever plate 18*b* in alignment with the fixed top guide members 28 as viewed from the side of the apparatus in FIG. 3**.

An adjustable front guide 32 is connected to and supported by the hinge plate 19 by means of machine screws 34 which extend through hollow spacer members 35 and are threadably received in the adjustable front guide 32. The employment of different length spacer sleeve members 35 enables as adjustable front to rear positioning of the front spacer 32 to accommodate different sizes of cans with it being noted that the outermost position of the front guide 32, which is achieved by complete elimination of the spacer members 35, is illustrated in dotted lines in FIG. 3. Adjustment of the position of the front guide 32 is enabled by unlatching of the hinge plate 19 and loosening of the pivot bolt 19' followed by the outer pivotal movement of the hinge plate about pivot bolt 19' which permits access to the guide 32 for changing the spacer sleeve 35 so as to adjust the total distance between the fixed guide 26 and the adjustable guide 32 so as to be able to accommodate cans of different lengths.

Figure 6:
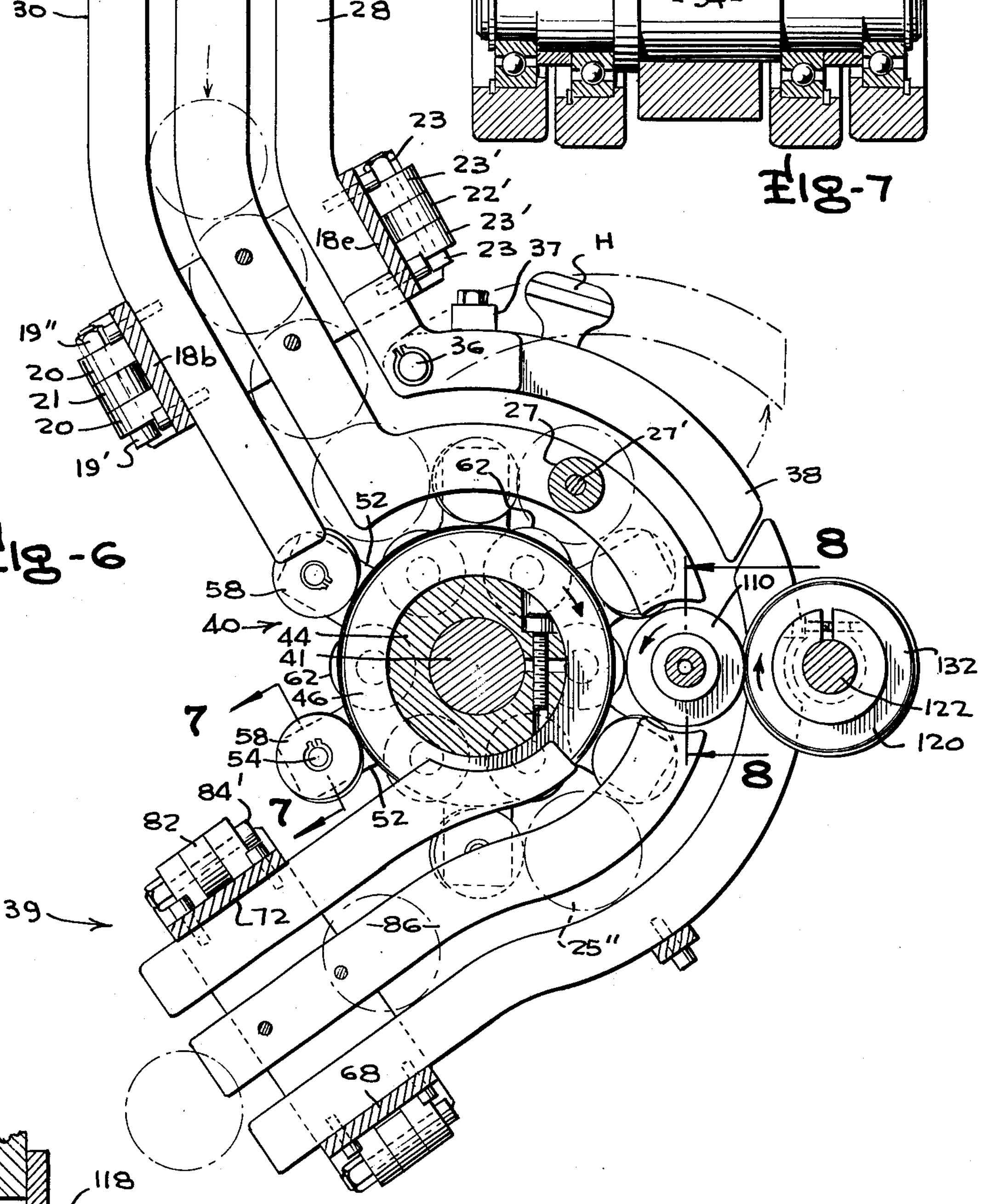
FIG. 6 is a sectional view taken along lines 6—6 of FIG. 3.
Figure 8:
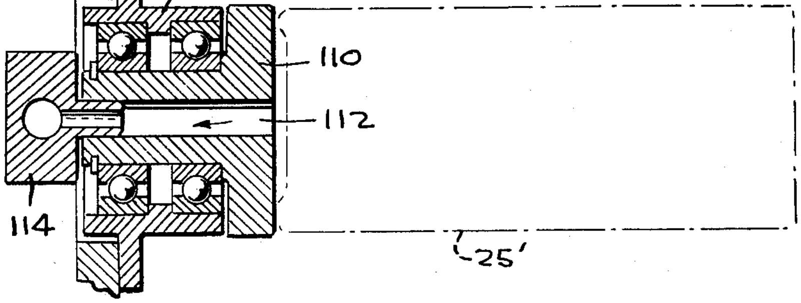
FIG. 8 is a sectional view taken along lines 8—8 of FIG. 6.

A pivot shaft 36 extends between and is mounted on the lower portion of the fixed top guide member 28 to provide pivotal support for pivotal guide members 38 which can be pivoted upwardly and outwardly by a handle H to the dotted line position as illustrated in FIG. 6 but which are normally in the solid line position of said figure. A stop 37 is connected to the upper surface of the pivot guide members 38 to engage the lower portion of the guide 28 and maintain the pivotal guide member 38 in the solid line position illustrated in FIG. 8.

A can feeding turret generally designated 40 and which will be discussed in detail hereinafter is positioned to receive the can members from the upper can guide means 28, 32, 30 etc. so as to convey the cans past the spraying means 17 from which they are discharged to can outfeed guide means supported on a lower can guide support bracket 39.

Figure 5:
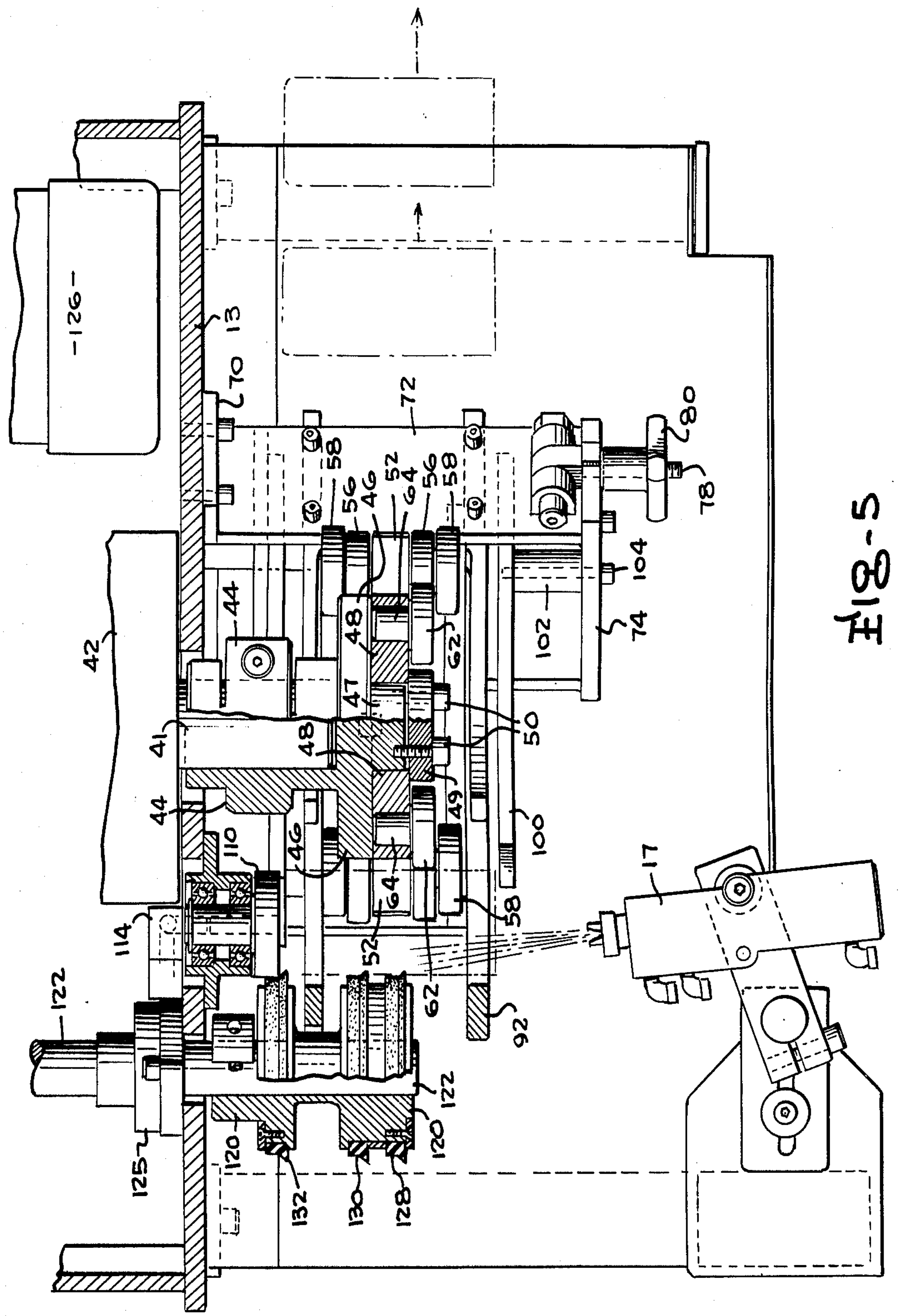
FIG. 5 is a sectional view taken along lines 5—5 of FIG. 2.

Indexing turret 40 is mounted on an indexing shaft 41 (FIG. 5) constituting the output of a conventional indexing drive means 42 having an input drive shaft 42' driven by a turret drive motor 43 FIG. 3) by means of a belt 43' extending between a pulley on the drive shaft of the motor 43 and an input pulley on the input shaft 42'. Shaft 41 is indexed in sixty degree increments of movement by the drive means 42. Turret 40 includes a clamp collar 44 clamped onto the indexing shaft 41 and including a radial mounting flange 46 as shown in FIG. 5. A cylindrical axial extension 47 defines the outer extent of the mounting coller 44. A roller support plate 48 is provided with an axial aperture matingly received over the cylindrical axial extension 47 with a circular retainer plate 49 of a larger diameter than the cylindrical axial extension 47 being fixed to the outer end of the extension 47 by machine screws 50 for retaining the roller support plate 48 in position in a manner that will be apparent from inspection of FIG. 5.

Figure 7:
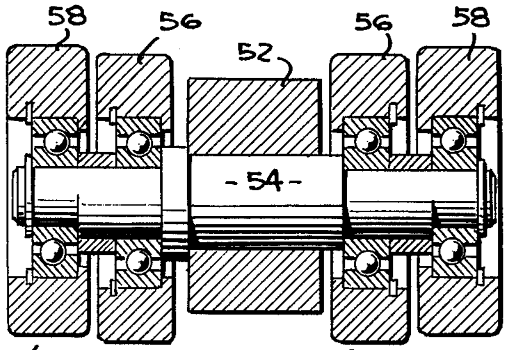
FIG. 7 is a sectional view taken along lines 7—7 of FIG. 6.

Roller support plate 48 is provided with six equidistantly spaced radial arms 52, the outer ends of which support a compound shaft 54 as best shown in FIG. 7. Compound shaft 54 supports a first pair of axially aligned inner side rollers 56 positioned adjacent opposite faces of the radial arms 52 and a second pair of outer side rollers 58 positioned outwardly of and eccentric to the rollers 56 as shown in FIG. 7. The positioning of the rollers is the same on all of the shafts 54 so that the rollers 56 engage a can held between these rollers and the rollers 58 on the next-adjacent radial arm 52 and vice-versa. For example, a can positioned to engage the upper edge of rollers 58 in FIG. 7 would engage the lower edge of the rollers 56 of the next radial arm above the arm 52 while a can engaged by the lower edges of rollers 56 in FIG. 7 would be engaged by the upper edges of the rollers 58 of the next lower arm 52. Additionally, an inner backup idler roller 62 is mounted on shaft 64 on the roller support plate 48 of the turret for supporting can members received between the idler rollers 56 and 58 between which roller 62 is equidistantly spaced inwardly toward the axis of rotation of the turret. The rollers 56, 58 and 62 define can support stations for supporting can members for rotation by means to be discussed. pivotally connected to element 18*b*. Similarly, the upper end of hinge plate 74 is provided with a slot in which a threaded latch rod 78 is received for clamping the plate 74 in position by a lock knob 80 operable in the same identical manner as the previously discussed lock knob 24. Latch rod 78 is connected to a pivotal fitting 82 carried by a pivot bolt 84 in the same manner that pivot bolt 23 is carried by fitting 22'. The inner backup roller 62 provides a backup force against the surface of the can diametrically opposite the friction drive rings 128 and 130 near the front or open end of the can while the vacuum chuck 110 provides backup force for the inner or closed end of the can.

A fixed rear guide 86 is mounted on the connecting plate 73 and fixed side guides 88 and 90 are mounted on lower cantilever plates 68 and the intermediate cantilever plate 69. An extension guide 92 is affixed to the face of the guide 90 and extends upwardly and around the outer periphery of the indexing turret 40. An adjustable front guide 100 is mounted on the hinge plate 74 by spacer sleeves 102 and machine screws 104 in the same manner that the adjustable front guide 32 is mounted on the hinge plate 19.

Cans 25 are fed to the indexing turret by the guide means 26, 28, 30, 32, etc. to be received between the rollers 56, 58 of adjacent radial arms 52 while also engaging the inner idler roller 62 between arms 52 to be indexed in two successive indexing steps to a coating station in which the can 25' in that station faces the sprayer 17. Can 25' is attracted to a rotary vacuum chuck 110 by virtue of the fact that the chuck 110 has an internal compartment 112 connected by a fitting 114 and a conduit 116 (FIG. 1) to a source of vacuum which can easily be continuously applied or intermittently applied in timed relation to the feed of the cans to the coating station. It is to be noted that the vacuum chuck 110 is supported for rotation in bearing means 118 on the main support plate 13.

Can 25' at the coating station is rotated by a drive member 120 mounted on a driven shaft 122 supported by bearing means 123 and 125 and driven by a belt 124 from a spin drive motor 126. Drive member 120 includes friction drive rings 128 and 130 engaged with the side of a can 25' and a friction drive ring 132 engaging the side of the vacuum chuck 110 so as to rotate the chuck in a manner that will be obvious from inspection of FIGS. 5 and 6.

Control of the can feeding and spraying functions is provided by control means including a cycle initiating sensor 136 actuated by an actuator 138 on the input shaft 42' which is driven at a constant speed by the motor 43 as previously discussed. A can present sensor 137 is positioned adjacent the spraying station to detect and insure the presence of a can therein prior to operation of sprayer 17.

It should be understood that the cycle initiate and can present sensors can be of a wide variety of conventional type devices such as magnetic or capacitative sensors or mechanically operated switches. In any event, the sensor 136 is actuated by the actuator 138 to provide a trigger signal to initiate a cycle of operation of a conventional timer 157 capable of providing electrical output signals at predetermined time intervals for operating the spray means 17 for a desired time interval to coat the interior of the can 25' in the spraying station.

More specifically, the time first actuates a solenoid valve (not shown) for connecting conduit 116 to a source of vacuum to move the base of the can against vacuum chuck 110. After a sufficient time delay to permit the can to reach maximum rotational speed, the time then provides an output signal to a solenoid valve 140 (assuming can present sensor 137 is activated) in an air pressure line 142 providing compressed air to the sprayer 17. Line 142 provides control compressed air to the sprayer 17 for actuating a valve in the sprayer to initiate the spraying operation. When the valve in the sprayer is unactuated, paint under approximately 600 pounds per square inch pressure merely flows into the sprayer 17 from a paint supply conduit 144 and is circulated through the sprayer for return to the paint supply by a return conduit 146. The control means also includes a can supply sensor 148 positioned to detect cans being fed to the guide means and which can be of any conventional type such as a magnetic or capacitative sensor or a mechanical type sensor such as a contact switch. Additionally, a pneumatically operated feed stop device is provided including a movable rubber stop member 150 which moves into the can feed path upon the application of air pressure by a control line 150 to terminate the feed of cans in the event of a malfunction of the apparatus. Member 150 is moved into the blocking position by the operation of a piston contained within the housing 154.

In operation, the cans are fed downwardly to the indexing turret 40 to be received for indexing to the work or spray station at which they are provide with an internal coating of paint or the like by the spray means 17. The shaft 42' is driven by a constant speed motor so that the actuator 138 provides a signal to the sensor 136 at given time intervals which signal is initiated after a can 25' is positioned in the work station. After the can has reached rotational speed, the timing means which has been previously initiated by the sensor 136 actuates the solenoid valve 140 to actuate the sprayer 17 for a preset time internal during which the can rotates from three to five revolutions depending upon the nature of the particular coating operation. The operation of the sprayer 17 is then automatically terminated by the timer prior to the beginning of the next 60° indexing movement of the work turret 40. The can is subsequently discharged on the second indexing movement of the work turret following its coating to be guided outwardly from the guide means 100 etc. as shown in FIG. 2. The can 25'' in the next indexing position beyond the work station is moved by gravity into contact with the guide members 90, 92 so as to stop spinning. In the preferred form of the invention, a solenoid valve controlled by the timing means operates to provide a connection to a source vacuum through line 116 to the vacuum chuck as the can is fed in alignment with the vacuum chuck. The connection to the source of vacuum is terminated prior to the indexing of the coating can away from the chuck. However, it would also be possible to use a continuous connection of the vacuum chuck to the source of vacuum if desired.

Upon the indexing of a can to the work station as represented by can 25', the can present sensor 137 will prevent operation of the spray means 17 if a can is not sensed in the work position. In the event that the can supply sensor 148 indicates that a can has not been fed into the upstream end of the machine, as would be the case if a malfunction should occur upstream of the device, the rubber stop 150 will be moved forwardly to terminate feed of any cans in the guide means until such time as the malfunction is corrected and the sensor 148 detects the presence of a can immediately adjacent thereto as illustrated in FIG. 1. The device will continue to function to feed any cans in the indexing turret to the spraying position; however, upon completion of the spraying operation on the last can fed to the turret, the spraying function will be terminated due to the failure of the sensor 137 to detect a can in the work station. While the indexing turret will continue to be operated, no spraying will occur until a can is subsequently fed into the coating position. It should be noted that the exhaust duct 106 is continuously operated to remove excess spray particles (overspray) from the vicinity of the open can ends as will be evidenced from inspection of FIG. 1.

In the embodiment of the invention illustrated in FIGS. 9–11, it is noted that many of the components are identical with the components of the first embodiment as previously discussed and that such identical components are given the same designators as applied in the first embodiment and are not discussed in detail in the following discussion.

Figure 9:
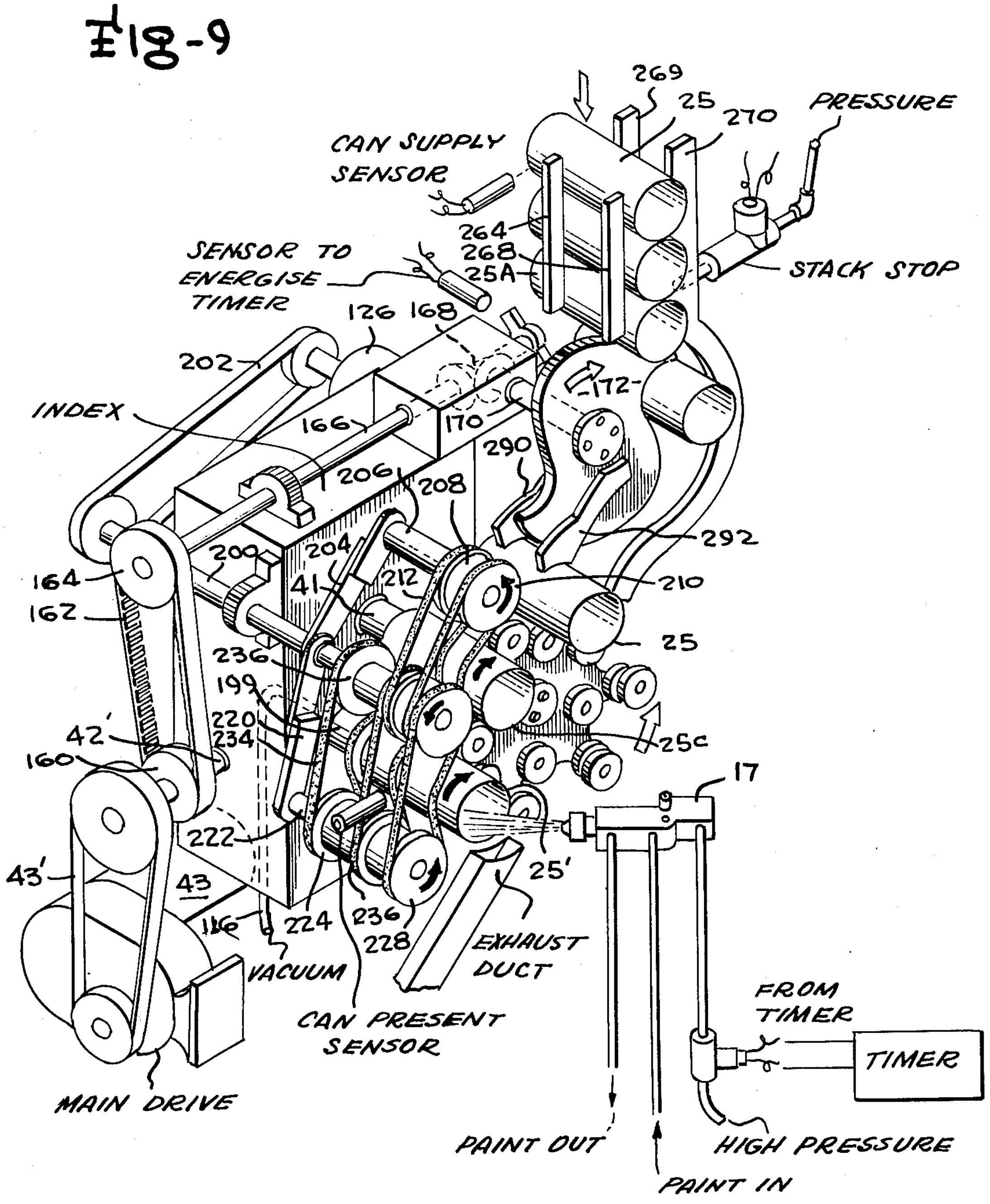
FIG. 9 is a perspective view of a second embodiment of the invention.
Figure 10:
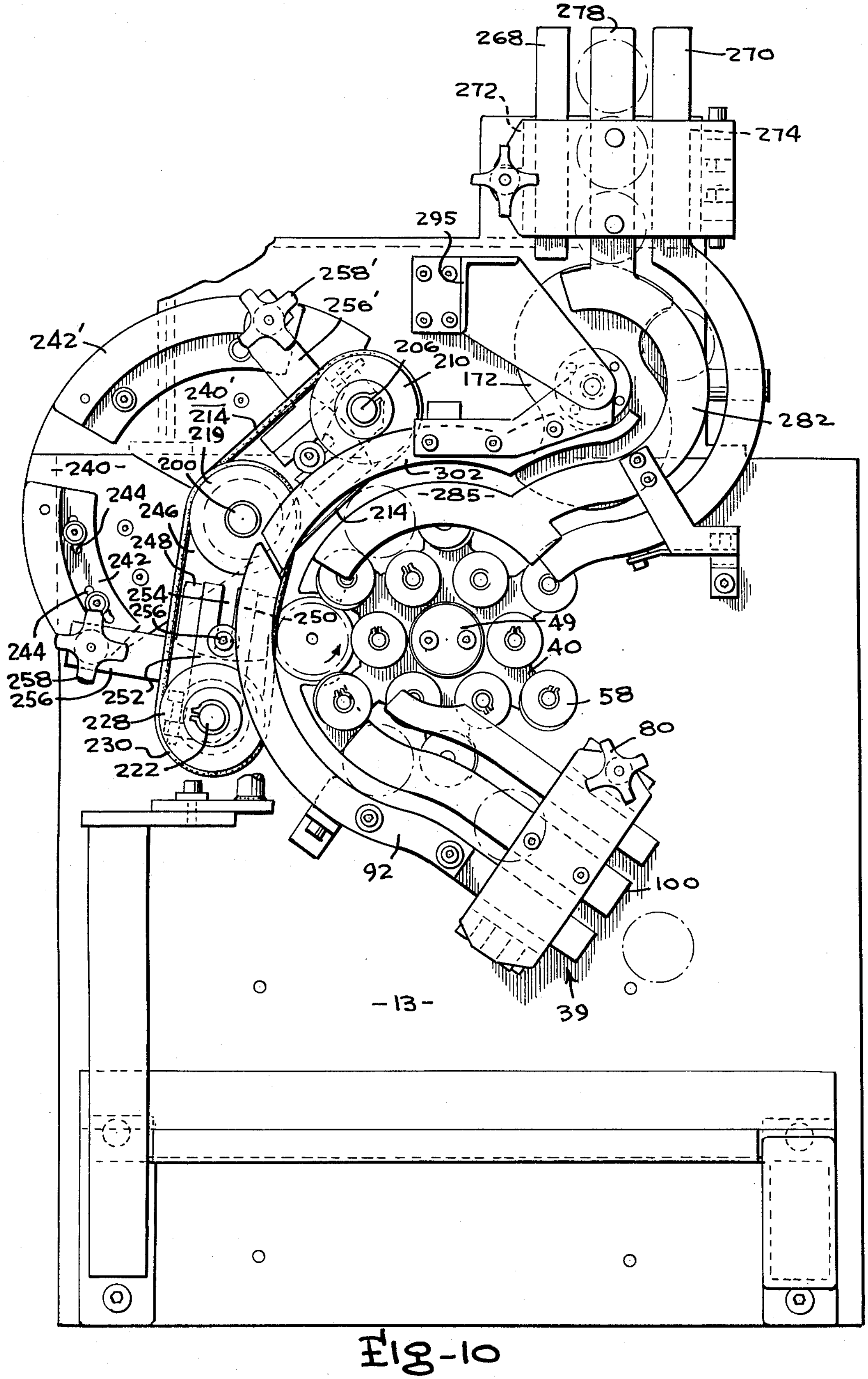
FIG. 10 is a front elevation view of the embodiment of FIG. 9.
Figure 11:
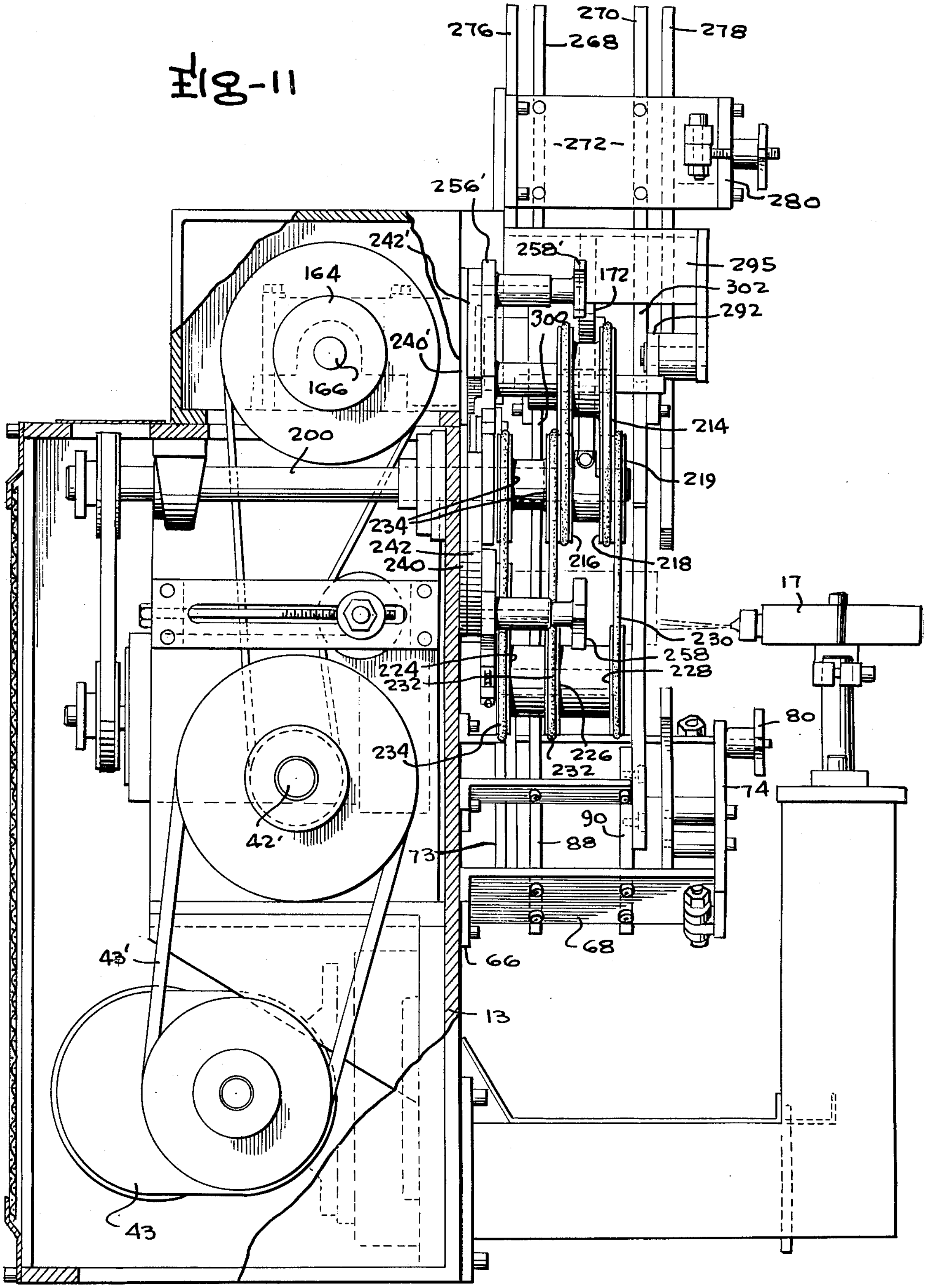
FIG. 11 is a side elevation view of the embodiment of FIG. 9.

The embodiment of FIGS. 9–11 is capable of faster operation than is the first embodiment due to the fact that the second embodiment provides for a power infeed of the can means at a rate substantially faster than that possible with the gravity can feed relied upon in the first embodiment. Additionally, the cans of the second embodiment are subjected to spinning action upstream of the work station so that the sprayer operation can be initiated as soon as the cans arrive at the work station without there being any need to permit the speed of the cans to buildup to a desired speed prior to actuation of the spraying means 17.

The second embodiment includes a fluted pulley 160 keyed to the indexing means drive shaft 42' which is driven by the motor 43 in the same manner as in the first embodiment. Fluted pulley 160 provides a non-slip drive to a belt 162 which is also engaged with a second fluted pulley 164 keyed to the end of a positive feed drive shaft 166 drivingly connected by bevel gears 168 to a drive shaft 170 on the end of which a positive action star wheel 172 is fixedly mounted.

Can spinning means is provided for initiating the spinning of the cans prior to movement of the cans into the spraying or work station so as to avoid the time required in the first embodiment for bringing the cans up to rotational speed after they have moved into the spraying station. In the second embodiment, the cans are rotating under positive drive action as they move into the spraying station and the sprayer 17 can consequently be activated much more quickly after the arrival of the cans at the spraying station than would otherwise be the case. The can 25' in the spraying station is engaged with the vacuum chuck 199 in the same manner as in the first embodiment and it should be understood that the vacuum chuck 199 will normally be connected by the conduit 116 to a solenoid valve or the like for providing a timed valve actuation for attracting the can as it moves into spraying position and for releasing the can after completion of the spraying operation. However, a continuous vacuum can be applied to the conduit 116 if desired. When a continuous vacuum is applied to line 116, the mechanical movement of the turret simply strips the can away from the attractive force provided by the vacuum chuck. It should be understood that the pictorial illustration of FIG. 9 is simplified somewhat from the illustrations of FIGS. 10 and 11 in order to better illustrate the nature and operation of the components.

A main spin drive shaft 200 is supported on bearings on the housing and is driven by a belt 202 extending from the spin drive motor 126 with the speed of rotation of the shaft 200 being substantially constant. Pivotal shaft supporting link means generally designated and illustrated as 204 in FIG. 9 but illustrated in detail in FIGS. 10 and 11 is mounted for pivotal adjustment of the axis of shaft 200 and support an upstream roller support shaft 206 on the outer ends of which a pulley having two spaced sheaves 208 and 210 is mounted for free rotation. Friction drive belts 212 and 214 are fitted over the sheaves 208 and 210 and have their lower ends extending about sheaves 216 and 218 of a pulley keyed to the main spin drive shaft 200. Similarly, a pivotal shaft supporting link 220 symbolically illustrated in FIG. 9 is mounted for pivotal movement about the axis of shaft 200 and supports a downstream roller support shaft 222 on which idler sheaves 224, 226 and 228 are mounted for free rotation. A friction belt 230 extends about the outer sheave 219 on driven shaft 200 and sheave 228 and a similar friction belt 232 extends about the idler sheave 226 and a sheave 234 on shaft 200. A vacuum chuck drive friction belt 234 extends about idler sheave 224 and a drive sheave 236 keyed to the drive shaft 200. Friction drive belt 234 engages the side of the vacuum chuck 199 for rotating same in an obvious manner while the belts 212 and 214 engage can members being fed toward the spraying station to initiate rotation of the can members which are maintained in rotation by engagement with the belts 230 and 232 during the spraying operation.

More specifically, a bracket plate 240 is mounted on the front face of the main support plate 13 and has an actuate attachment lug 242 mounted adjacent its outer edge of its front face in an adjusted position by virtue of the fact that adjustment slots 244 are provided in lug 242 through which mounting screws or bolts 245 extend to permit adjustment of the position of member 240 in an obvious manner. A pivotally adjustable plate 246 including outwardly extending parallel ribs 248 and 250 on its forward face has an aperture encircling the shaft 200 so as to be pivotable about shaft 200. A slide plate 252 having a slot 254 at one end is mounted between the ribs 248 and 250 and is held in adjusted position by the tightening of a machine bolt 256 positioned in slot 254 as shown in FIG. 10. Downstream roller support shaft 222 extends outwardly from the lower end of the slide plate 252 and a retaining arm 256 extends outwardly from the plate into position over the attachment lug 242 as shown in FIG. 10. A knob 258 on the end of a threaded member 260 is provided for attaching the retaining arm 256 to the attachment lug 242 by means of a threaded aperture in the lug 242 so as to hold the arm 256, shaft 222 etc. in an adjusted fixed position as illustrated in FIG. 10.

The means for adjustably mounting the upstream roller sheave support shaft 206 is essentially identical to the aforementioned means mounting the lower or downstream roller support shaft 222 except that it is in reverse orientation and the corresponding parts thereof are provided with primed designators identical to the designators applied to the corresponding parts of the lower shaft support means.

The uncoated cans 25 are fed downwardly to the apparatus between vertically extending side guide members 264 and 268 on one side of the can and vertically extending side guide members 269 and 270 on the other side of the cans as best illustrated in FIG. 9. Side guide members 264 and 268 are mounted on a fixed horizontal support plate 272 as illustrated in FIG. 11 and the vertically extending side guide members 269 and 270 are similarly mounted on a fixed horizontal support plate 274 spaced from and parallel to the plate 272. A fixed end guide 276 is positioned in facing relationship to the closed or bottom end of the can members and an adjustable end guide 278 is mounted on a hinge plate 280 facing the open ends of the can members. The adjustable end guide is held in position on hinge plate 280 against spacer members identical to spacer members 35 used for positioning the adjustable guide 38, for example, in the first embodiment. The hinge plate 280 can be opened to permit the use of different sizes of spacer members to effect an adjustment of the distance between the end guides 276 and 278 for enabling the accommodation of different sizes of cans. It is to be noted that the lower portion of the guides 269 and 270 curves outwardly arcuately to a downward termination adjacent the turret 40 and the lower end of the adjustable end guide 278 has an arcuate portion 282 and a can end facing portion 285 adjacent the cans being fed by the turret toward the spraying station. Additionally, stripper guide plates 290 and 292 are provided along opposite sides of the star wheel 172 and are supported by bracket means 295 extending outwardly from the housing. Extension guide rails 300 and 302 are respectively pivotally mounted on the lower ends of the deflector plates 290 and 292 to maintain the cans on the turret as it rotates in a counterclockwise direction as viewed in FIG. 10.

Rotation of the star wheel 172 results in the individual engagement of the lower can member 25A being fed to the star wheel by guides 264, 268, 269 and 270 followed by the forceful movement of the lowermost can downwardly to a lower position at which stripper guide plates 290 and 292 strip the can from the star wheel into the turret which is driven in timed relation with respect to the star wheel and which is dwelling in a stationary position at that time. As the can is indexed by the star wheel, it is eventually engaged by the friction belts 212 and 214 as it moves into the next upstream position from the spraying position (illustrated by the can 25C in FIG. 9) which impart rotational movement to the can. Consequently, the can is rotating at full speed when it enters the spraying station so that the spraying means 17 can be immediately activated. Also, the vacuum chuck will normally be connected to a source of vacuum by a solenoid valve controlled by the essentially same control means as that employed with the first embodiment.

Figure 13:
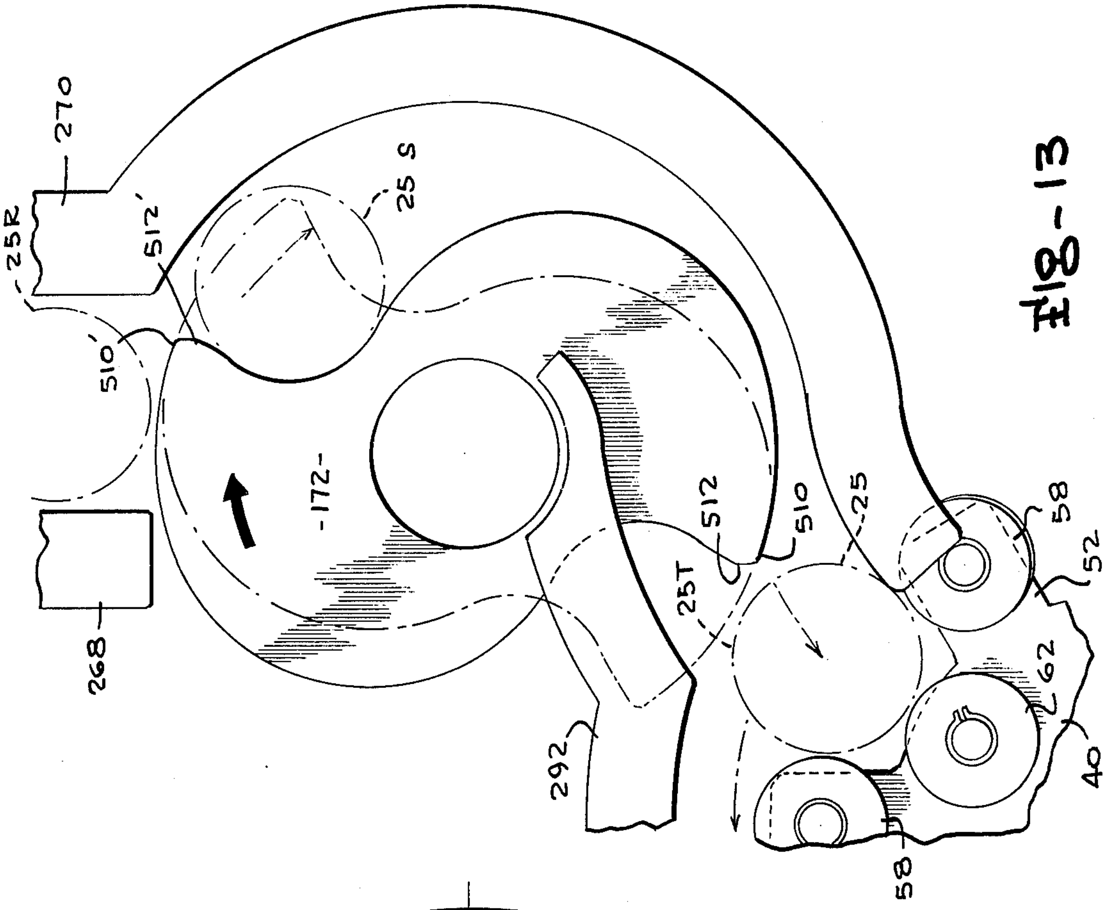
FIG. 13 is the same as FIG. 12 but illustrates the parts in a subsequent position of operation.
Figure 12:
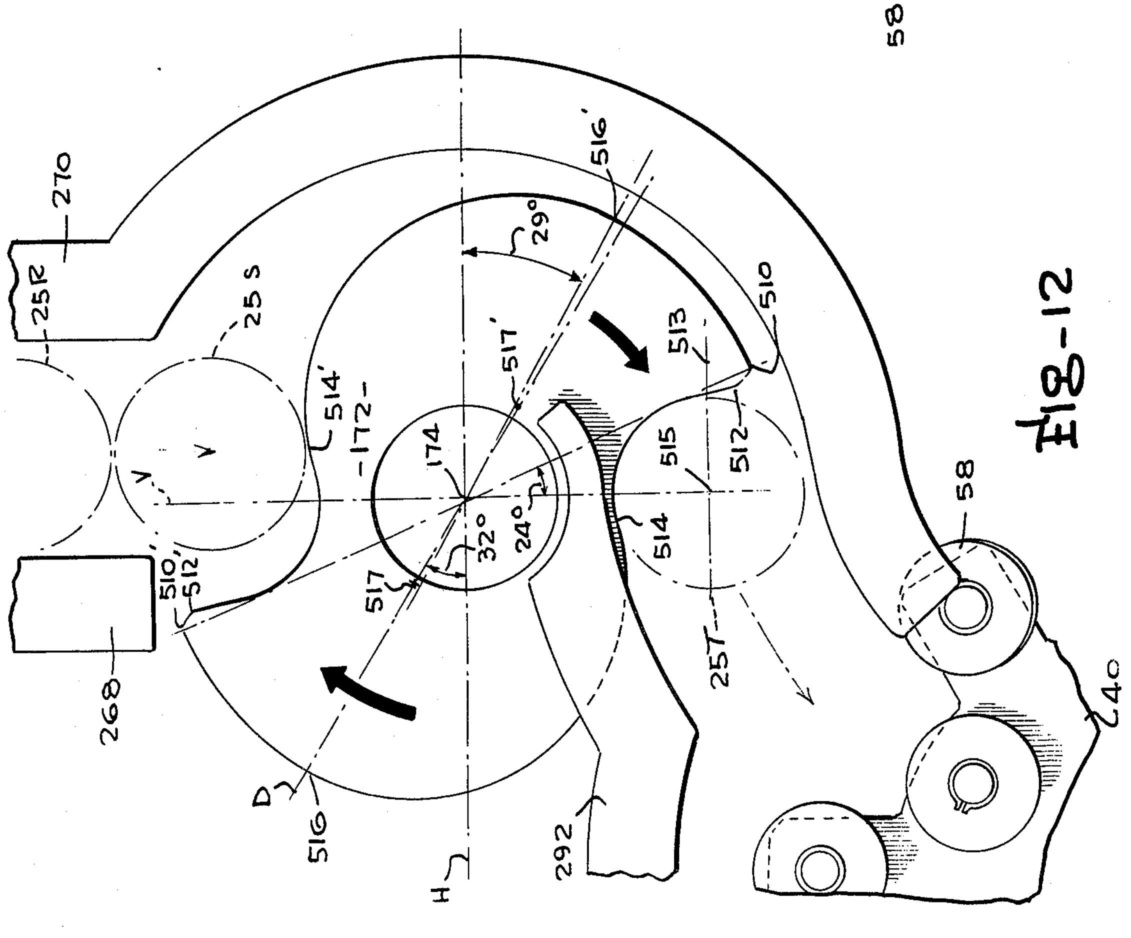
FIG. 12 is an enlarged front elevation view of the star wheel of the second embodiments illustrating the parts in a first position.

The star wheel 172 has an axis at 174 about which it rotates and an outer edge surface engageable with the cans for feeding the cans to the turret 40 at a rapid rate and also includes a surface for maintaining the cans in the turret until the turret is indexed to its next position. Only one half of the star wheel periphery (essentially the left half in FIGS. 12 and 13) will be discussed since the other half of the star wheel (to which corresponding primed designators have been applied) is of identical configuration. More specifically, the star wheel includes a relatively sharply circular curved can roll-off or picker edge surface comprising a tip portion extending from point 510 to point 512 having a center of curvature at 513 located internally of the star wheel in approximately horizontal alignment with the axis of a can 25T when the can is directly below the axis of rotation as shown in FIG. 12. A can nesting portion having approximately the same radius of curvature as the can extends from point 512 to point 514, an arcuate extent of approximately 105°. The center of curvature 515 of the arcuate edge 512 to 514 is coaxial with the axis of the cans when the cans nest in the star wheel as in the case of can 25T of FIG. 12 and can 25S of FIG. 13. An arcuate surface of moderate curvature extends from point 514 to point 516 and is of constant radius about a center of curvature 517. An arcuate surface of lesser curvature having a center of curvature coextensive with axis 174 extends from point 516 to point 510′ from which point the surface of the star wheel repeats itself.

The approximate angular relationships of the various arcuate surfaces of the star wheel are illustrated in FIG. 12 with significant relative dimensions being as follows: radius of curvature of arc 510–512 being 0.525; radius of curvature for arc 512–514 being 1.312; radius of curvature for arc 514–516 about center of curvature 517 being 2.812; radius of curvature of arc 516–510′ about axis 174 being 4.125. The line D comprises the diameter line on which the centers of curvature 517 and 517′ are located. It will be noted that the curvature of the stripper guide plates 292 and the curvature of the star wheel 172 is such that the cans are stripped outwardly from the star wheel and roll across the curved surface 512–510 of the star wheel to be forcefully kicked into the turret 40 as will be evident from inspection of the positions of the cans 25T in the successive positions of FIGS. 12 and 13. Subsequent rotation of the star wheel 172 beyond the solid line position of FIG. 13 to the dotted line portion occurs before the indexing movement of the turret begins and brings the arcuate surface 510–516' into relatively close proximity to the can surface so that the star wheel edge serves as a guide rail to retain the can on the turret and prevent the can from being held outwardly by centrifugal force when the turret is rapidly indexed.

Many modifications of the preferred embodiment of the invention will undoubtedly occur to those of skill in the art; for example, the can detecting members 137, 148 etc. can be magnetic type sensors, air or micro type switches or photocells. Therefore, it should be understood that the spirit and scope of the invention is to be limited solely by the appended claims.

I claim:

1. Automatic can coating means for providing a liquid coating on the interior of the open-ended cans, said coating means comprising turret means mounted for rotation about an axis, a plurality of can supporting means equidistantly spaced around the periphery of said turret means and including means for supporting cans for rotation about the can axis, indexing means for indexing said turret through a predetermined angle of rotation at predetermined time intervals separated by dwell periods, can infeed means adjacent said turret for feeding a can into each can supporting station as the respective stations are positioned in proximity to said can infeed means, selectively operable spray means facing said turret in a position defining a spraying station during the dwell of successive cans carried by said turret in said spraying station, vacuum chuck means mounted in a fixed position adjacent said spraying station for attracting the end of a can in said spraying station, control means for actuating said spray means upon the detection of a can dwelling in said spraying station and spin drive means including a rotary member having friction drive means drivingly engaged with both said vacuum chuck and a can in the spraying station for rotating said vacuum chuck and the can in the spraying station at a desired speed prior to initiation of actuation of said spraying means so that said spraying means provides a uniform coating of liquid on the interior of the can in the spraying station.

2. The invention of claim 1 wherein the friction drive means of said spin drive means includes friction roller means engageable with the side of the can in the spraying station and the side of said vacuum chuck and wherein said can supporting means each include backup idler roller means on said turret diametrically opposite said friction roller means with respect to a can in said spraying station and outer idler rollers mounted on said turret radially outwardly of said backup idler roller equidistantly spaced from said backup roller to engage opposite sides of a can positioned between said outer idler rollers and engaged with said backup roller.

3. The invention of claim 2 wherein said control means includes a can present sensor positioned adjacent said spraying position for detecting the presence of a can in said spraying position and timer means connected to said selectively operable sprayer means for actuating said selectively operable sprayer means for a predetermined time period only when a can is present in said spraying position as indicated by said can present sensor.

4. The invention of claim 1 wherein said control means includes a can present sensor positioned adjacent said spraying position for detecting the presence of a can in said spraying position and timer means connected to said selectively operable sprayer means for actuating said selectively operable sprayer means for a predetermined time period only when a can is present in said spraying position as indicated by said can present sensor.

5. The invention of claim 4 wherein said spin drive means includes means positioned outwardly with respect to the axis of rotation of the turret for engaging the outer surface of said cans for initiating the rotation of each of said cans prior to the arrival of each of said cans at said spraying station.

6. The invention of claim 5 wherein said means positioned outwardly of the idler roller means for engaging the outer surface of the cans includes continuously driven friction drive belt means positioned adjacent the path of travel of the cans and extending between the next upstream dwell position of the can supporting means from the spraying position and the spraying position for engaging cans in said next upstream dwell position to rotate the cans at a desired speed and for maintaining engagement with and rotation of said cams during an indexing operation of said cans to the spraying position.

7. The invention of claim 1 wherein said can spin drive means includes a constant speed driven shaft extending parallel to the axis of and adjacent the periphery of said turret, friction means mounted on and driven by said constant speed driven shaft drivingly engaged with a can in said spraying station for rotating said can.

8. The inventin of claim 7 wherein said friction means includes first and second upwardly extending friction belts, sheave means on said driven shaft over which one end of said first and second upwardly extending friction belts is positioned, idler sheave means over which an opposite end of said friction belts is positioned, one flight of each of said friction belts being engaged with a can in the next upstream dwell position of said can supporting means from the spraying position for effecting rotation of said can in said next upstream dwell position, first and second downwardly extending friction drive belts extending downwardly adjacent said spraying position, one end of said first and second downwardly extending belts being mounted on a sheave on said constant speed driven shaft, an opposite end of said downwardly extending friction belts being mounted on lower idler sheaves, said first and second downwardly extending friction belts each including a flight engageable with the side of a can positioned in said spraying position and wherein said means for rotating said vacuum chuck comprises a downwardly extending chuck drive friction belt having its upper end mounted on a sheave means fixed to said constant speed driven shaft, a lower idler sheave over which said downwardly extending chuck drive friction belt has its opposite end positioned, one flight of said downwardly extending chuck drive friction belt extending between the sheave on said constant speed shaft and said lower idler sheave being positioned to drivingly engage the side of said vacuum chuck to rotate said vacuum chuck.

9. The invention of claim 1 wherein said can infeed means includes a star wheel positioned adjacent said turret, shaft means supporting said star wheel for rotation about an axis parallel to the axis of said turret, means for rotating said star wheel at a constant speed, guide means for guiding the lowermost one of a stack of cans to a position adjacent said star wheel, said star wheel having an outer surface shaped for positively engaging said lowermost can fed to said star wheel by said guide means and positively carrying said can in a rapid manner to be received in a can supporting means on said turret positioned adjacent said star wheel during the dwell of said turret.

10. The invention of claim 9 wherein said star wheel comprises a rotary member having a can engaging edge surface comprising first and second diametrically positioned can nesting edge surfaces of a radius of curvature approximately the same as the cans being fed by said star wheel and a center of curvature externally of said star wheel, first and second relatively sharply curved kicker edge surfaces respectively extending contiguously outwardly from one end of one of said can nesting edge portions and having a substantially smaller radius of curvature than the can nesting edge surfaces and a center of curvature positioned on the interior of said star wheel, first and second diametrically positioned arcuate follower edge surfaces of relatively small curvature respectively extending contiguously outwardly from one of said kicker edge surfaces and having a center of curvature coextensive with the axis of rotation of said star wheel and first and second diametrically positioned moderately curved arcuate positioning edge surfaces having a center of curvature on the interior of said star wheel and having a smaller radius of curvature than said follower edge surfaces, said positioning edge surfaces respectively extending contiguously from one end of one of said nesting edge surfaces and one end of one of said follower edge surfaces.

11. The invention of claim 10 additionally including stripper guide plates extending inwardly on opposite sides of said star wheel having curved surfaces engageable with cans carried by the can nesting portion of said star wheel to move the cans outwardly radially with respect to the star wheel up onto the kicker surfaces so that the cans are forcefully ejected into said turret by rotation of the star wheel so that the follower surface portion of the star wheel follows in close proximity to the can in the turret following placement of the can in the turret to maintain the can in position in the turret during indexing movement of the turret.

12. Article handling means for feeding cylindrical workpieces comprising turret means supported for rotation about an axis of rotation, a plurality of workpiece receiving and supporting stations equidistantly positioned about the periphery of said turret means, indexing drive means for effecting indexed movement of said turret in index steps of movement equal the angular spacing between adjacent workpiece receiving stations with dwell periods between said indexed steps of movement, a rotary star wheel member mounted for rotation about an axis parallel to the axis of rotation of said turret means, said rotary star wheel having a workpiece engaging edge surface comprising first and second diametrically positioned nesting edge surfaces of a radius of curvature approximately the same as the workpiece being fed and a center of curvature positioned externally of said star wheel, workpiece supply means adjacent said star wheel for positioning a workpiece in said workpiece nesting edge surfaces upon rotation of said nesting edge surfaces past said workpiece supply means, said star wheel edge surface additionally including first and second relatively sharply curved kicker edge surfaces respectively extending contiguously outwardly from one end of one of said nesting edge portions and having a substantially smaller radius of curvature than the nesting edge surfaces and a center of curvature positioned on the interior of said star wheel, first and second diametrically positioned arcuate follower edge surfaces of relatively small curvature respectively extending contiguously outwardly from one of said kicker edge surfaces and having a center of curvature coextensive with the axis of rotation of said star wheel and first and second diametrically positioned moderately curved arcuate positioning edge surfaces having a center of curvature on the interior of said star wheel and having a smaller radius of curvature than said follower edge surfaces, said positioning edge surfaces respectively extending contiguously from one end of one of said nesting edge surfaces and one end of one of said follower edge surfaces, stripper guide plates extending inwardly on opposite sides of said star wheel having curved stripper surfaces engageable with workpieces carried by the nesting edge surfaces of said star wheel, drive means for continuously rotating said star wheel in timed relation to the indexed movement of said turret so that said curved surfaces engage a workpiece in the nesting edge surfaces to move said workpiece outwardly radially with respect to the star wheel up onto the kicker surface so that the workpiece is forcefully ejected into a workpiece receiving station of the turret in a dwell position adjacent the star wheel by rotation of the star wheel with the follower surface portion of the star wheel moving in close proximity to the workpiece in the turret following placement of the workpiece in the turret to maintain the workpiece in position in the turret during an immediately subsequent indexing movement of the turret.

* * * * *